(12) United States Patent
Saravanan et al.

(10) Patent No.: US 11,606,208 B2
(45) Date of Patent: Mar. 14, 2023

(54) KEYLESS AUTHENTICATION SCHEME OF COMPUTING SERVICES

(71) Applicant: Microsoft Technology Licensing, LLC, Redmond, WA (US)

(72) Inventors: Paranthaman Saravanan, Redmond, WA (US); Marc Andrew Power, Seattle, WA (US); Yang Zhang, Bellevue, WA (US); Matthias Adam Leibmann, Redmond, WA (US); Grigory V. Kaplin, Redmond, WA (US); Yi Zeng, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 16/851,286

(22) Filed: Apr. 17, 2020

(65) Prior Publication Data
US 2021/0328793 A1     Oct. 21, 2021

(51) Int. Cl.
*H04L 9/32*     (2006.01)
*G06F 16/245*     (2019.01)

(52) U.S. Cl.
CPC .......... *H04L 9/3213* (2013.01); *G06F 16/245* (2019.01); *H04L 9/3268* (2013.01)

(58) Field of Classification Search
CPC ........ G06F 16/245; G06F 21/44; G06F 21/53; G06F 2221/2129; H04L 9/3213; H04L 9/3268
See application file for complete search history.

(56) References Cited

U.S. PATENT DOCUMENTS

| | | | |
|---|---|---|---|
| 9,137,131 B1* | 9/2015 | Sarukkai | H04L 63/0815 |
| 9,509,782 B2 | 11/2016 | Lawson et al. | |
| 9,819,668 B2* | 11/2017 | Krishna | H04L 63/0815 |
| 10,341,410 B2* | 7/2019 | Lander | H04L 67/02 |
| 11,032,270 B1* | 6/2021 | Tsarfati | H04L 63/0281 |
| 2006/0015933 A1* | 1/2006 | Ballinger | H04L 63/105 726/10 |

(Continued)

OTHER PUBLICATIONS

Chandramouli, et al., "Building Secure Microservices-based Applications Using Service-Mesh Architecture", In Publication of National Institute of Standards and Technology, Jan. 17, 2020, 25 Pages.

(Continued)

*Primary Examiner* — Mohammad A Siddiqi
(74) *Attorney, Agent, or Firm* — Christopher J. Volkman; Kelly, Holt & Christenson, PLLC

(57) ABSTRACT

Techniques of keyless authentication of computing services in distributed computing systems are disclosed herein. One example technique includes upon receiving a command to instantiate a computing service, transmitting a request to an authentication service for an identity assertion token corresponding to an application execution of which instantiates the computing service. The example technique can also include upon receiving the requested identity assertion token, storing the received identity assertion token in the container and modifying an entry of a configuration file in the container that allows the instantiated computing service to access the stored identity assertion token and authenticate to the authentication service using the identity assertion token.

19 Claims, 7 Drawing Sheets

(56) References Cited

U.S. PATENT DOCUMENTS

| | | | |
|---|---|---|---|
| 2015/0074407 A1* | 3/2015 | Palmeri | H04L 51/32 |
| | | | 713/171 |
| 2016/0119291 A1 | 4/2016 | Zollinger et al. | |
| 2017/0230349 A1* | 8/2017 | Gaur | G06F 21/57 |
| 2018/0081983 A1 | 3/2018 | Carru et al. | |
| 2018/0083971 A1* | 3/2018 | Brown | H04L 67/38 |
| 2019/0180002 A1 | 6/2019 | Gaur et al. | |
| 2020/0007530 A1 | 1/2020 | Mohamad abdul et al. | |
| 2021/0126910 A1* | 4/2021 | Chauhan | H04L 63/0815 |

OTHER PUBLICATIONS

Hanhart, Julian, "Building Secure Microservice Architectures", Retrieved from: http://www.awesomo.ch/docs/term-paper/secure-microservices.pdf, Retrieved Date: Mar. 2, 2020, 15 Pages.

Madurai, Vivek, "Microservice Authentication", Retrieved from: https://medium.com/@vivekmadurai/microservice-authentication-70b2dde94a0, Aug. 23, 2019, 4 Pages.

Fetzer, Christof, "Building Critical Applications Using Microservices", In Journal of IEEE Security & Privacy, vol. 14, Issue 6, Dec. 14, 2016, 4 Pages.

"International Search Report and Written Opinion Issued in PCT Application No. PCT/US2021/018436", dated May 27, 2021, 16 Pages.

* cited by examiner

KEYLESS AUTHENTICATION SCHEME OF COMPUTING SERVICES

BACKGROUND

Remote or "cloud" computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines ("VMs"), containers, virtual switches, load balancers, and other types of virtualized components for resource sharing. During operation, the virtual machines or containers can facilitate execution of user applications to provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, remote servers can provide computing services to multiple subscribers or "tenants" via virtualization of compute, storage, network, or other suitable types of physical resources. For example, a server can execute suitable instructions on an operating system to provide a hypervisor for managing multiple virtual machines hosted at the server. The server can also provide a container manager for managing multiple containers on the server. Each virtual machine or container can execute suitable applications to provide computing services to users of tenants. As such, multiple tenants can share physical resources as computing services at the servers. On the other hand, a single tenant can also consume physical resources from multiple servers, storage devices, or other suitable components of the computing facilities as a single computing service.

In certain computing facilities, various computing services may interact with one another when providing computing services to tenants. For example, computing services may be organized as platform services and microservices that support the platform services. For instance, a platform service can be an email exchange service that is configured to handle email reception, forwarding, synchronization, and other suitable operations. An example email exchange service is Outlook® service provided by Microsoft Corporation of Redmond, Wash. With the email exchange service, a user can be allowed to access user content such as emails and attachments in corresponding mailboxes. In order to provide the user content, the email exchange service can rely on one or more microservices for support. For instance, during operation, a mailbox microservice can authenticate itself and then provide emails to the email exchange service, which in turn can provide the received emails to a client device of the user. In another example, a calendar microservice can be configured to provide data of calendar items, reminders, or other suitable content to the email exchange service upon authentication.

In order to facilitate interactions of computing services, computing facilities can implement an authentication service configured to facilitate authentication of microservices to platform services and/or to one another. For instance, an authentication service can be configured to receive an authentication request from a microservice. In response, the authentication service can be configured to validate credentials of the requesting microservice according to an authentication scheme. Upon validation of the credentials, the authentication service can be configured to generate and transmit a security token to the microservice based on an authentication profile of the microservice. The authentication profile can contain information such as configuration of token acquisition, identities, and/or other suitable information. The microservice can then utilize the received security token to authenticate itself to a platform service (or other suitable computing services) in order to provide content to or performing other suitable actions for the platform service.

In certain computing facilities, during acquisition of the security token, a microservice can present a digital certificate as credential to the authentication service. The digital certificate can be signed by a private key issued to the microservice by a certificate authority. The authentication service can then utilize a public key of the microservice to authenticate the received digital certificate, verify identity of the microservice based on the digital certificate, and issue the security token upon successful verification.

As the number of microservices increases, an amount of credential data such as private and public keys, digital signatures, and thumbprints also increases. As each microservice may require different cryptography keys for different operating environments, managing the amount of credential data can become a significant overhead. For instance, when the cryptography keys expire, correctly updating the expired cryptography keys can be time consuming and error prone. Further, when a microservice is provided by executing an application inside an isolated guest operating system ("guest OS"), such as a container, the microservice may not have access to any credential data residing on a host of the guest OS. As such, the microservice may not be able to generate or present valid digital certificates to the authentication service for acquiring the security token. Deploying the microservice in an isolated guest OS also prevents the microservice from utilizing client-server authentication, such as Windows authentication, as the isolation of the guest OS prevents the identity of the microservice from being visible outside the guest OS.

Several embodiments of the disclosed technology can address the foregoing drawbacks by implementing a keyless authentication scheme that does not utilize cryptography keys or digital certificates. In certain implementations, a bearer-token authentication scheme can be implemented for a microservice deployed inside an isolated OS, such as a container. For example, a container manager (or other suitable types of entities) on a server can be configured to receive a command from a user or another computing service to instantiate the microservice by executing a corresponding application inside a container managed by the container manager. In response, the container manager can transmit a request to the authentication service for a bearer token referred to below as an identity assertion token or "identity token" associated with the microservice.

Upon receiving the request from the container manager, the authentication service can be configured to determine an identity of the container manager and the application corresponding to the microservice based on the received request. The authentication service can then consult a database of authorization policy records to determine whether the container manager is allowed to receive an identity assertion token for the microservice and whether an identity assertion token is allowed to be issued for the application to be executed in the container managed by the container manager. In response to determining that the identity assertion token is allowed to be issued, the authentication service generates and transmits data representing an identity assertion token issued to the microservice (and the executed application) to the container manager. The identity assertion token can include data that identify the container manager, the application, the microservice, an identity of the application and/or microservice, or other suitable information. In one embodiment, the identity assertion token can be configured as a JSON web token. In other embodiments, the identity assertion token can be a binary encoded token, an Extensible Markup Language ("XML") encoded token, or a token that is otherwise suitably encoded.

Upon receiving the identity assertion token from the authentication service, the container manager can be configured to cause the application to be executed in the container to instantiate the microservice. The container manager can also make the received identity assertion token accessible to the container and the application executing in the container. For example, the container manager can store the received identity assertion token in the container or at other suitable locations accessible to the container and the executed application. The container manager can also be configured to associate an identity of the executed application (e.g., an application identifier) with the stored identity assertion token and create an entry in a configuration file (e.g., a registry file) that allows the executed application to access the stored identity assertion token.

During operation, a security client of the microservice can be configured to determine whether the application is executed in an isolated OS (e.g., a container) or on a host by consulting the configuration file. Upon determining that the application is executed inside a container, the security client can initialize a keyless caller that is configured to access the authentication service via a computer network. For example, the keyless caller can be configured to submit a request for a security token to the authentication service with the stored identity assertion token attached. Upon receiving the request, the authentication service can be configured to validate the received identity assertion token to verify the identity of the microservice for the received request. Based on the verified identity, the authentication service can then determine whether a security token can be issued to the application with the verified identity by consulting the database of the authorization policy records. Upon determining that the security token can be issued, the authentication service can be configured to generate and issue a security token to the application, which can then be utilized to authenticate the microservice to a platform service or other suitable computing services. As such, the microservice can be authenticated to other computing services without using a digital certificate or managing credential data.

In other implementations, a client-server authentication can be implemented for a microservice deployed on a host that also provides a runtime of the authentication service. For example, a server (or virtual machine) can be configured to execute suitable instructions to provide a runtime of the authentication service and an application service. Upon receiving a command to instantiate the microservice, the application service can be configured to execute the corresponding application to provide the microservice. The application service can also assign a user account on the host to the instantiated microservice. In certain embodiments, the user account can be an account having a privilege level that is least privileged on the host. The user account can be visible within the host but not from outside of the host. The user account can expire when the microservice is terminated on the host or at other suitable time points. In other embodiments, the user account can have higher privilege levels and/or other suitable characteristics.

During operation, the microservice can be configured to determine whether the corresponding application is executed on the same host as the authentication service. In response to determining that the application is executed on the same host, the microservice can be configured to initialize a keyless caller that is configured to perform a client-server authentication (e.g., Windows authentication) with the authentication service using the assigned user account. Upon successful authentication, the authentication service can be configured to issue a security token to the microservice for interacting with other suitable computing services. As such, the microservice can authenticate to other computing services without using a digital certificate or managing credential data. In other implementations, the when the client-server authentication is unavailable or fails, the microservice can be configured to initiate a certificate-based authentication with the authentication service as an alternate.

Several embodiments of the disclosed technology can improve performance of the cloud computing system by eliminating or at least reducing management of digital certificates and associated credential data. By implementing the identity assertion tokens for microservices, the authentication service can issue security tokens to the microservices by verifying identities of the microservices based on the identity assertion tokens instead of digital certificates. Alternately, by co-locating a microservice and the authentication service at the same host, the microservice can be authenticated using a client-server authentication, such as Windows authentication using a user account of the microservice on the host. As such, digital certification validation and other related operations can be avoided. Thus, compute, network, storage, or other types of computing resources in computing facilities can be conserved while performance of the computing facilities can be improved.

DETAILED DESCRIPTION

Figure 1:
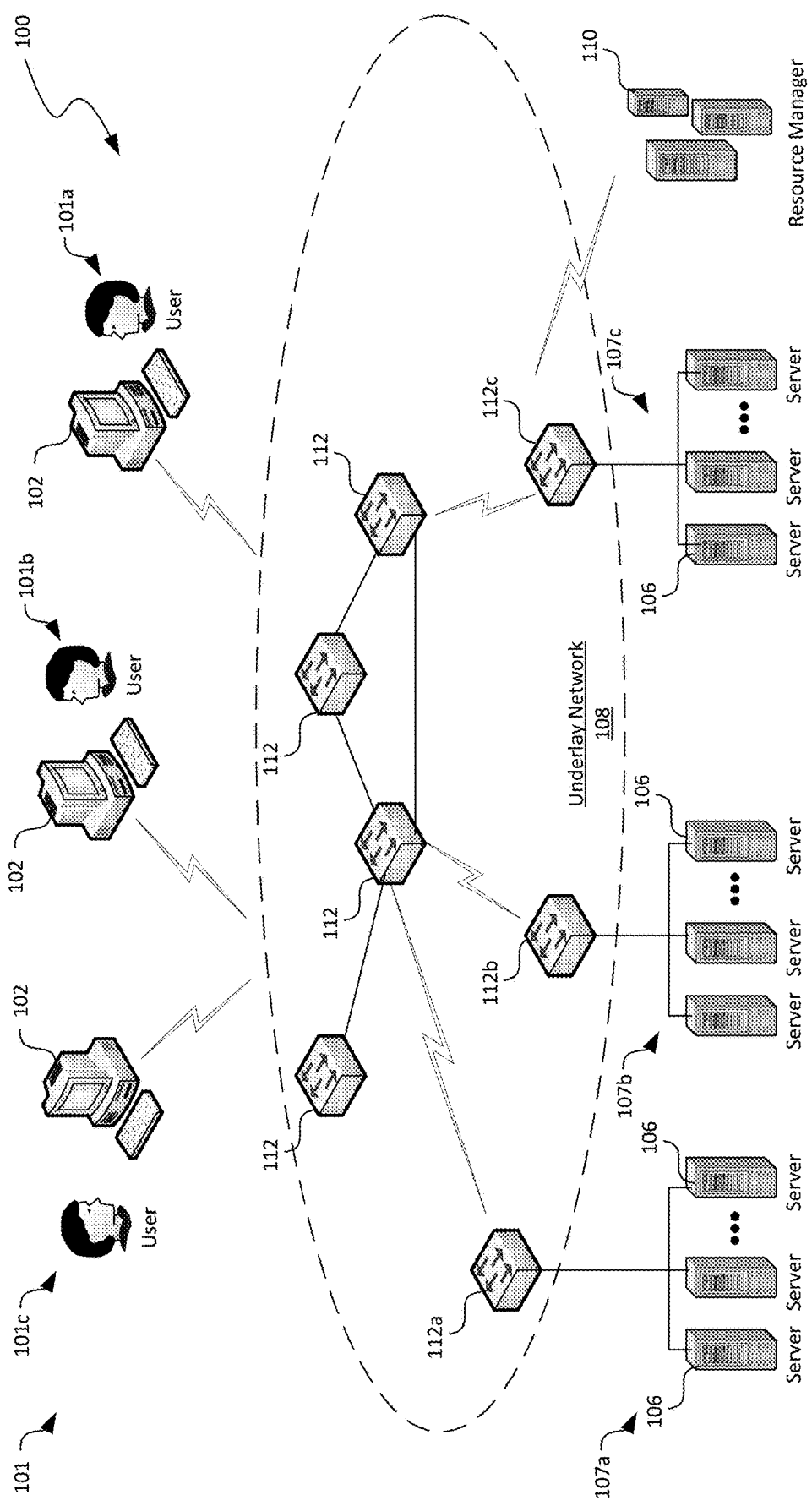
FIG. 1 is a schematic diagram illustrating a distributed computing system implementing keyless authentication of computing services in accordance with embodiments of the disclosed technology.

Certain embodiments of systems, devices, components, modules, routines, data structures, and processes for implementing keyless authentication of computing services in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

In one example, a "distributed computing system" can be a computing facility having a computer network interconnecting a plurality of host machines or hosts to one another or to external networks (e.g., the Internet). An example of such a computing facility can include a datacenter for providing cloud computing services. A compute network can include a plurality of network devices. A "network device" can be a physical network device, examples of which include routers, switches, hubs, bridges, load balancers, security gateways, or firewalls. A "host" or "host device" can include a computing device that is configured to implement, for instance, one or more virtual machines, containers, or other suitable virtualized components. For example, a host can include a remote server having a hypervisor configured to support one or more virtual machines, containers, or other suitable types of virtual components. In another instance, a host can also include a desktop computer, a laptop computer, a smartphone, a web-enabled appliance (e.g., a camera), or other suitable computing devices configured to implement one or more containers or other suitable types of virtual components.

In another example, a "hypervisor" can include computer software, firmware, and/or hardware that creates, manages, and runs one or more virtual machines on a host machine. A "virtual machine" or "VM" is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

In a further example, a "container" can include a software package that contains a piece of software (e.g., an application) in a complete filesystem having computer codes (e.g., executable instructions), a runtime environment, system tools, system libraries, device drivers, or other suitable components sufficient to execute the piece of software. Containers running on a single host or virtual machine can all share the same operating system kernel and can make use of system memory or virtual memory. Containers can have similar resource isolation and allocation benefits as virtual machines. However, a different architectural approach allows containers to be much more portable and efficient than virtual machines. For example, a virtual machine typically includes one or more applications, necessary binaries and libraries of the applications, and an entire operating system. In contrast, a container can include an application and all of its dependencies but shares an operating system kernel with other containers on the same host. As such, containers can be more resource efficient and flexible than virtual machines. One example container is a Windows Server container by Microsoft Corporation of Redmond, Wash. Another example container is a Linux container or LXC. Docker is a popular mechanism to package and deliver containers, provided by Docker, Inc. of San Francisco, Calif.

In yet another example, a "computing service" or "cloud service" can include one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally includes delivery of operating systems and associated services over the computer network without requiring downloads or installation. IaaS generally includes outsourcing equipment used to support storage, hardware, servers, network devices, or other components, all of which are made accessible over a computer network.

In another example, an "authentication scheme" can include a set of distinct requirements for credentials, procedures and/or protocols, or other distinct operational characteristics related to an authentication process. For example, bearer authentication is an authentication scheme that utilizes data packages called bearer tokens. A bearer token is a cryptic string that is usually generated by a server in response to a token request. A bearer token allows an entity (e.g., a user, a device, or a computing service) presenting the bearer token to access certain computing resources or perform computing operations. In another example, client-server authentication, such as Windows authentication, is an authentication scheme that hashes an entered username and password before sending across a network. In yet another example, certificate authentication uses a digital certificate issued by a trusted certificate authority to identify a user, machine, device, or computing service before granting access to a resource, network, application, etc. Other examples can include challenge-handshake authentication, extensible authentication, and other suitable authentication schemes.

In yet a further example, an "authentication service" can be a computing service that is configured to facilitate an authentication process upon receiving an authentication request from a requester, such as another computing service. One example authentication service is Security Token Service ("STS"), which is a cross-platform open standard component of a single sign-on infrastructure framework. Within that claim-based identity framework, STS can be responsible for issuing, validating, renewing, and cancelling security tokens. The security tokens issued by STS can then be used to identify a holder (e.g., a computing service) of the security token to other computing services for accessing resources and/or performing suitable actions.

A "security token" or "access token" can be a digital data package that contains security credentials for a login session and identifies an entity, a group of the entity, privilege(s) of the entity, and, in some cases, a particular application. Example security tokens can include a string of random characters that is composed of various fields and values thereof, such as an identifier, an identification of a logon session, a user identifier, a default owner, and/or other suitable fields. As described below, an authentication service can issue a security token to a computing service. The computing service can then authenticate to other computing services by presenting the security token.

In a further example, an "identity assertion token" or "identity token" can be a digital data package that contains security credentials for an identity under which an application is executed to provide a computing service. In one example, an identity assertion token can be issued by an authentication service to an application executed in a container, virtual machine, or other suitable types of guest operating system. The identity assertion token can include data such as an application identifier of the application and an identity name associated with the identity under which the application is executed. In other examples, an identity assertion token can be issued by other suitable entities or computing services and include additional and/or different information.

In certain computing facilities, authenticating a computing service to another can involve obtaining a security token from an authentication service. However, before issuing a security token, the authentication service may require a requesting computing service to authenticate itself according to an authentication scheme. For example, during acquisition of the security token, a microservice can present a digital certificate as credential to the authentication service. The digital certificate can be signed by a private key issued to the microservice by a certificate authority. The authentication service can then utilize a public key of the microservice to authenticate the received digital certificate, verify identity of the microservice based on the digital certificate, and issue the security token upon successful verification.

As the number of microservices increases, an amount of credential data such as private and public keys, digital signatures, and thumbprints also increases. As each microservice may require different cryptography keys for different operating environments, managing the amount of credential data can become a significant overhead. For instance, when the cryptography keys expire, correctly updating the expired cryptography keys can be time consuming and error prone. Further, when a microservice is provided by executing an application inside an isolated guest operating system ("guest OS"), such as a container, the microservice may not have access to any credential data residing on a host of the guest OS. As such, the microservice may not be able to generate or present valid digital certificates to the authentication service for acquiring the security token. Deploying the microservice in an isolated guest OS also prevents the microservice from utilizing client-server authentication, such as Windows authentication, as the isolation of the guest OS prevents the identity of the microservice from being visible outside the guest OS Several embodiments of the disclosed technology can address the foregoing drawbacks by implementing a keyless authentication scheme that does not utilize cryptography keys or digital certificates. In certain implementations, a bearer-token authentication scheme can be implemented for a microservice deployed inside an isolated OS, such as a container. In other implementations, a client-server authentication can be implemented for a microservice deployed on a host that also provides a runtime of the authentication service. By implementing the identity assertion tokens for microservices, the authentication service can issue security tokens to the microservices by verifying identities of the microservices based on the identity assertion tokens instead of digital certificates. Alternately, by co-locating a microservice and the authentication service at the same host, the microservice can be authenticated using a client-server authentication, such as Windows authentication using a user account of the microservice on the host. As such, digital certification validation and other related operations can be avoided. Thus, compute, network, storage, or other types of computing resources in computing facilities can be conserved while performance of the computing facilities can be improved, as described in more detail below with reference to FIGS. 1-7.

FIG. 1 is a schematic diagram illustrating a distributed computing system 100 having hosts implementing keyless authentication of computing services in accordance with embodiments of the disclosed technology. As shown in FIG. 1, the distributed computing system 100 can include a computer network (shown as an "underlay network 108") interconnecting a plurality of host machines shown as servers 106, a plurality of client devices 102 of users 101, and a resource manager 110 to one another. The resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 to access various computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
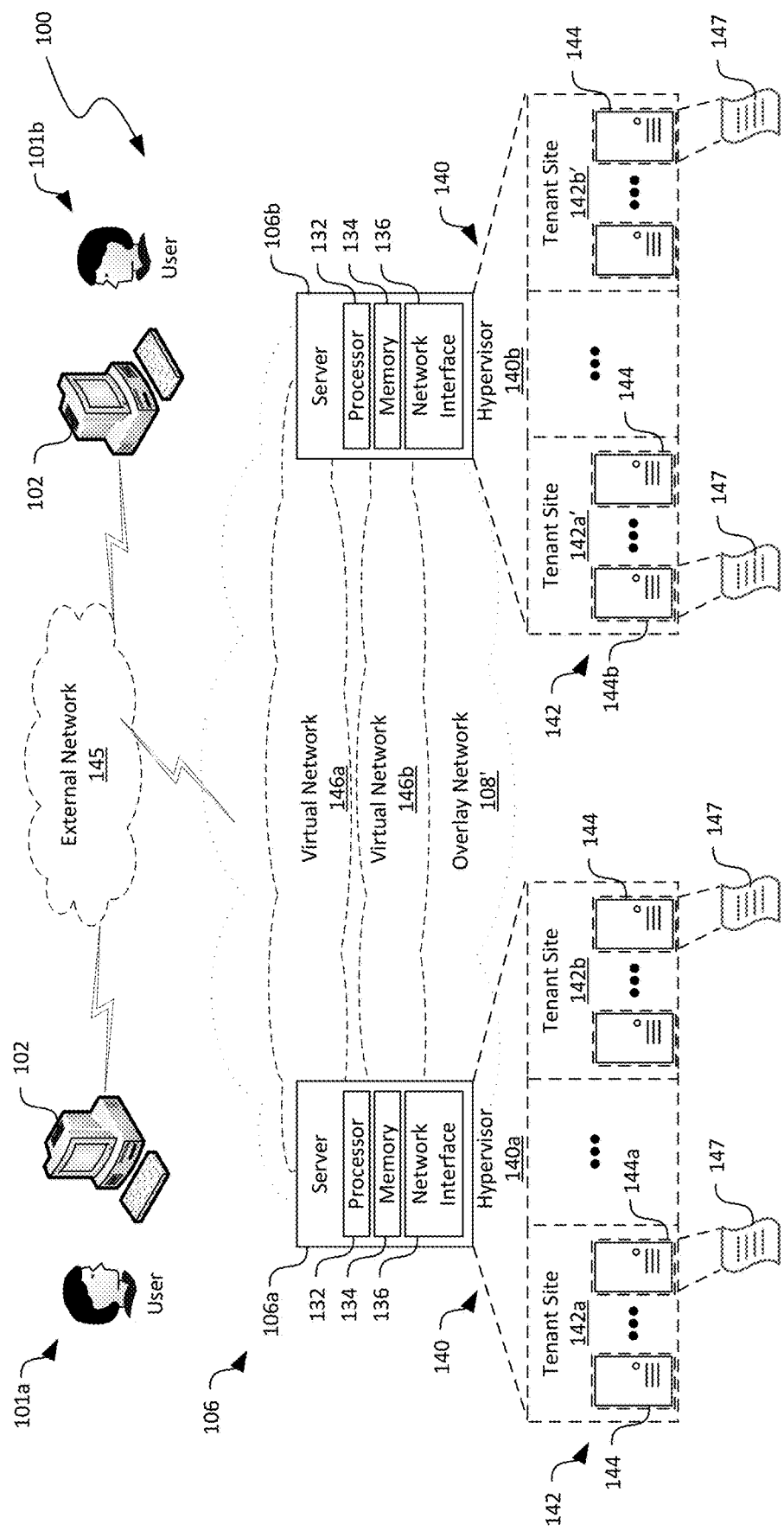
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a processor 132, a memory 134, and a network interface 136 operatively coupled to one another. The processor 132 can include one or more central processing units, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 6A and 6B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the processor 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. Though the hypervisors 140 are individually shown as software components in FIG. 2, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications 147 or processes corresponding to an operating system, middleware, and/or suitable applications. The executed applications 147 can each correspond to one or more computing services. Examples of such computing services can include platform services, microservices, authentication services, as discussed in more detail below with reference to FIGS. 3A and 3B. The first and second servers 106a and 106b or the virtual machines 144 hosted thereon can also support one or more containers 162 managed by a container manager 160 (shown in FIG. 4A) and individually executing one or more applications 147, as described in more detail below with reference to FIGS. 4A and 4B.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines 144 and/or applications 147 executing in the virtual machines 144. For example, the processor 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

Figure 3A:
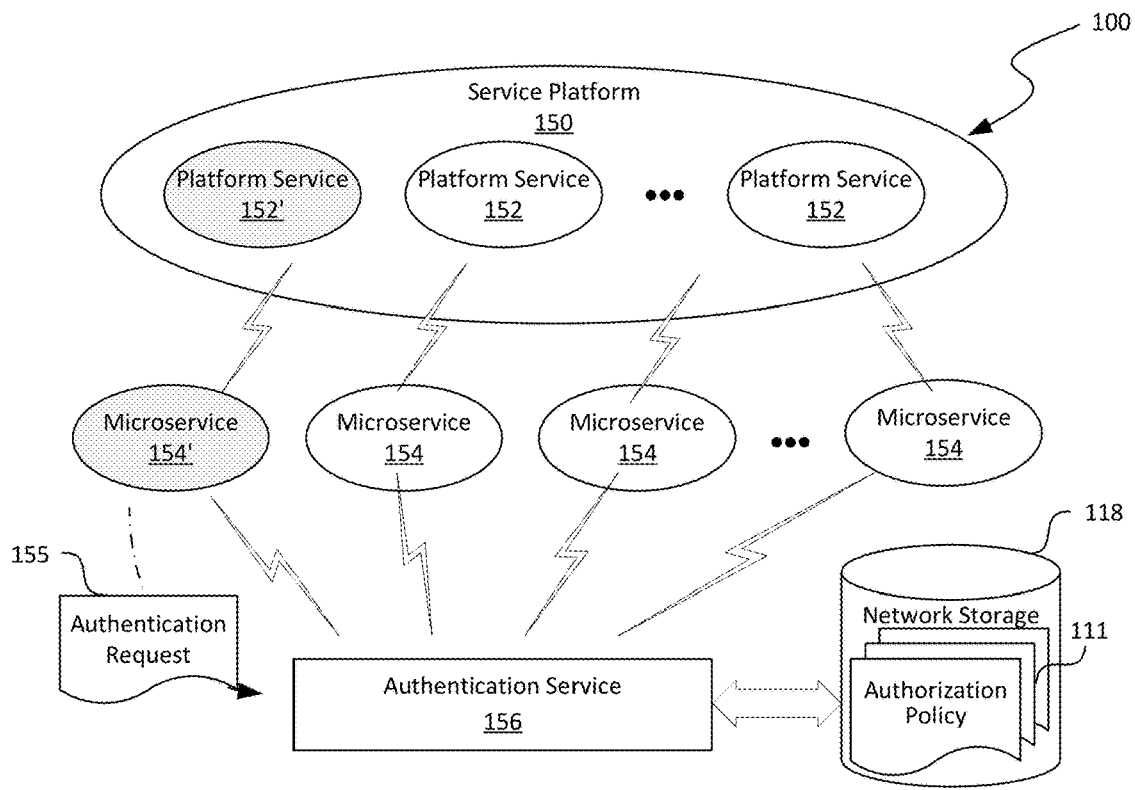
FIGS. 3A and 3B are schematic block diagrams illustrating an example organization of computing services provided in the distributed computing system of FIG. 1 in accordance with embodiments of the present technology.
Figure 3B:
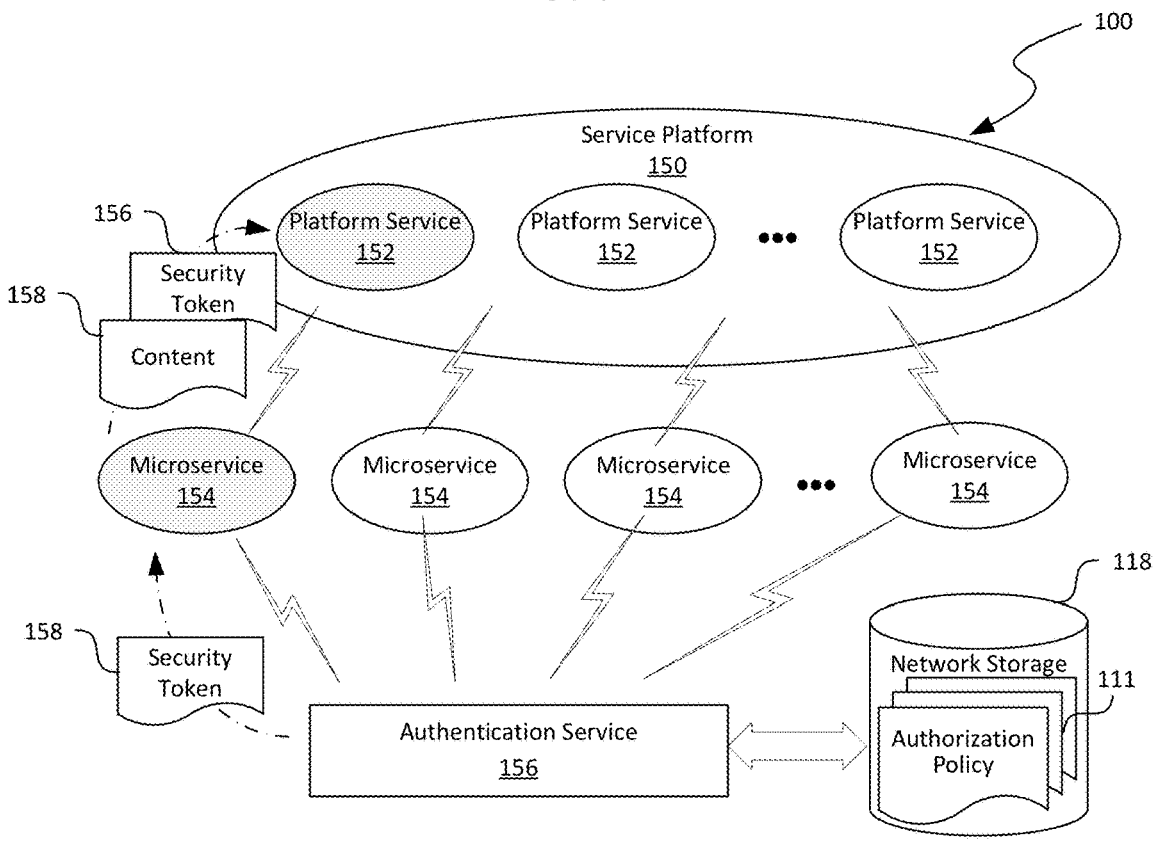

FIGS. 3A and 3B are schematic block diagrams of the distributed computing system 100 having an authentication service 156 configured for keyless authentication in accordance with embodiments of the present technology. In FIGS. 3A and 3B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 3A, the distributed computing system 100 can be configured to provide computing services organized as a collection of platform services 152 in a service platform 150 and microservices 154 that are configured to support the platform services 152. For instance, a platform service 152' can be an email exchange service that is configured to handle email reception, forwarding, synchronization, and other suitable operations. An example email exchange service is Outlook® service provided by Microsoft Corporation of Redmond, Wash. Upon authenticating to the email exchange service, a user 101 (FIG. 1) can be allowed to access content such as emails and email attachments in corresponding mailboxes. In order to provide such content, the email exchange service can rely on one or more microservices 154 for support. For instance, the email exchange service can rely on a mailbox microservice (shown as example microservice 154' in FIG. 3A) for emails or other suitable types of content.

To facilitate operations between pairs of the platform services 152 and the microservices 154, the distributed computing system 100 can also provide an authentication service 156 operatively coupled to a network storage 118 containing authentication policies 111. The configuration files 111 can individually contain information such as configuration of token acquisition and/or other suitable information. During operation, the authentication service 156 can be configured to receive an authentication request 155 from a microservice 154 for a security token 157 (shown in FIG. 3B). In response, as shown in FIG. 3B, the authentication service 156 can be configured to initiate an authentication process with the microservice 152 in order to validate security credentials of the microservice 154 according to a selected authentication scheme. Upon validation of the credentials, the authentication service 156 can be configured to generate and transmit a security token 158 (or other suitable security articles) to the microservice 154. The microservice 154 can then utilize the received security token 158 to authenticate itself to a platform service 152 (or other suitable computing services) in order to provide content 158 to or performing other suitable actions for the platform service 152. In turn, the platform service 152 can forward the received content to a client device 102 (FIG. 1) of the user 101. During acquisition of the security token 156, the distributed computing system 100 can implement keyless authentication of the microservice 154 to the authentication service 156, as described in more detail below with reference to FIGS. 4A-5.

Figure 4A:
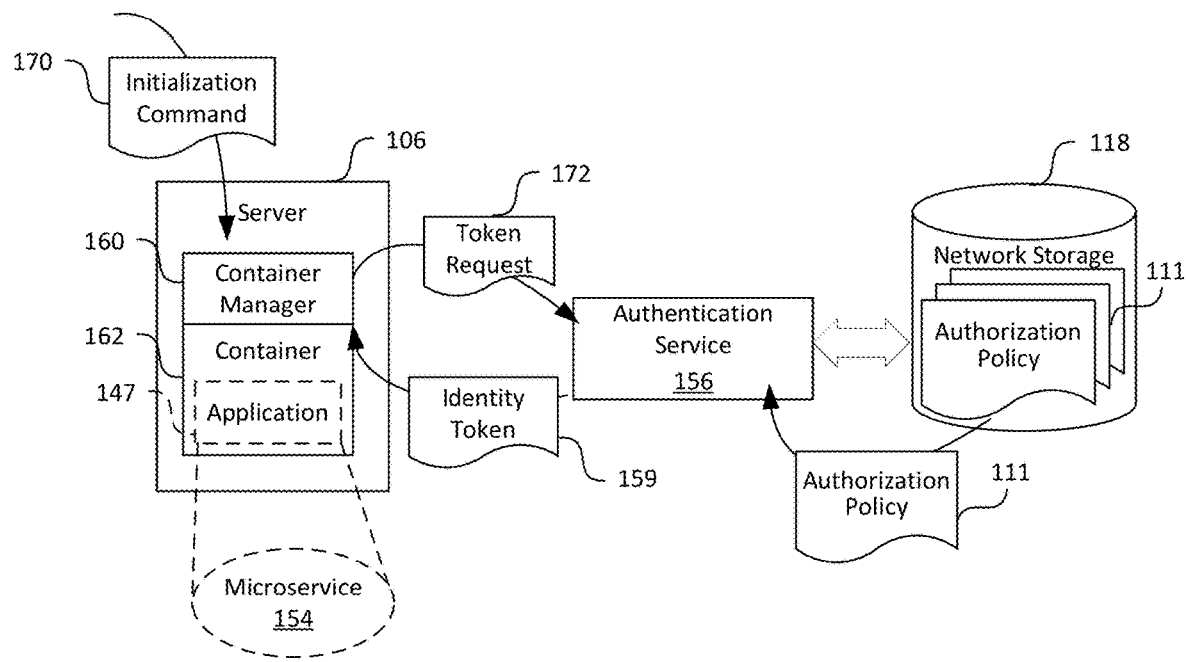
FIGS. 4A-4C are schematic block diagrams illustrating keyless authentication using bearer token authentication in the distributed computing system in accordance with embodiments of the present technology.
Figure 4B:
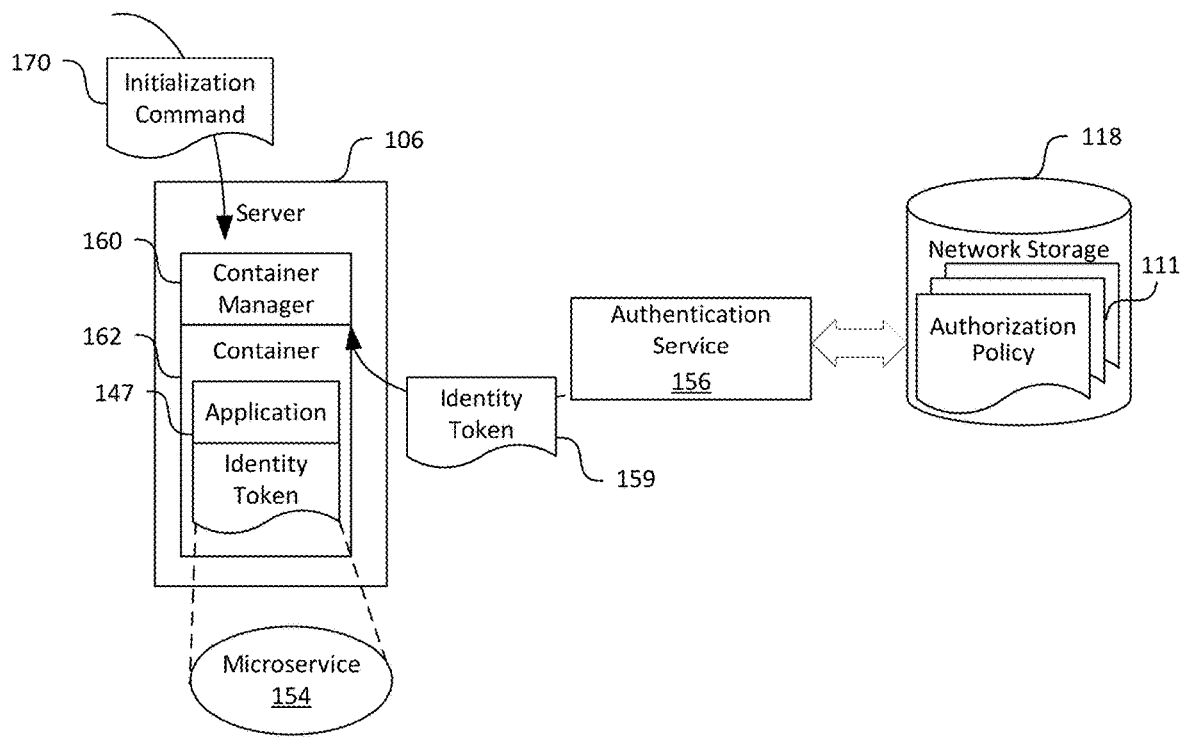
Figure 4C:
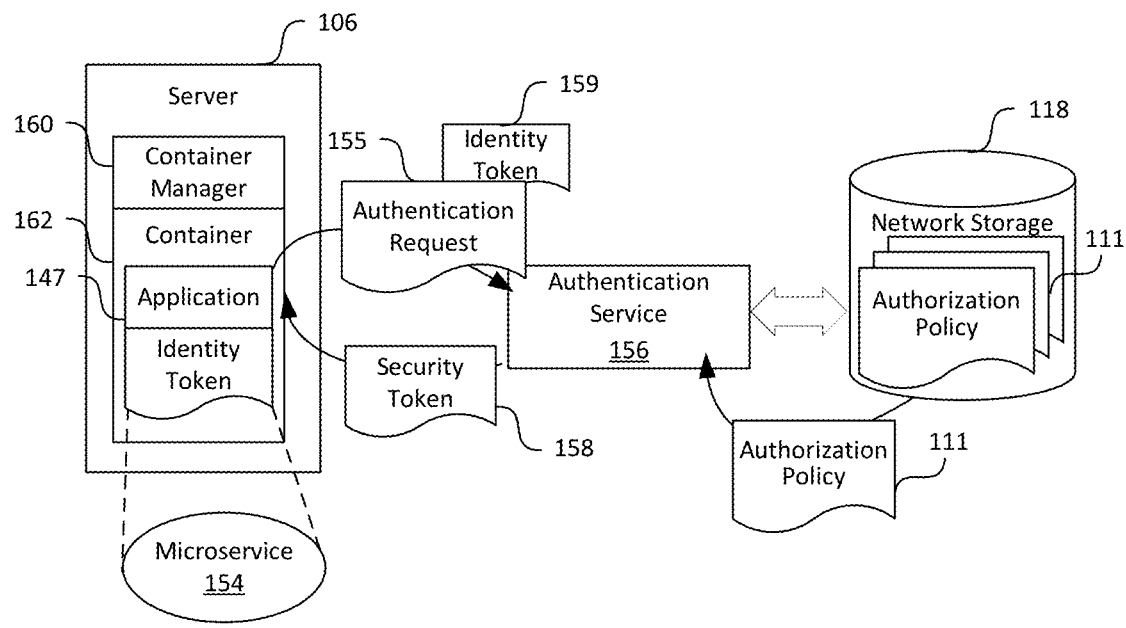
Figure 5:
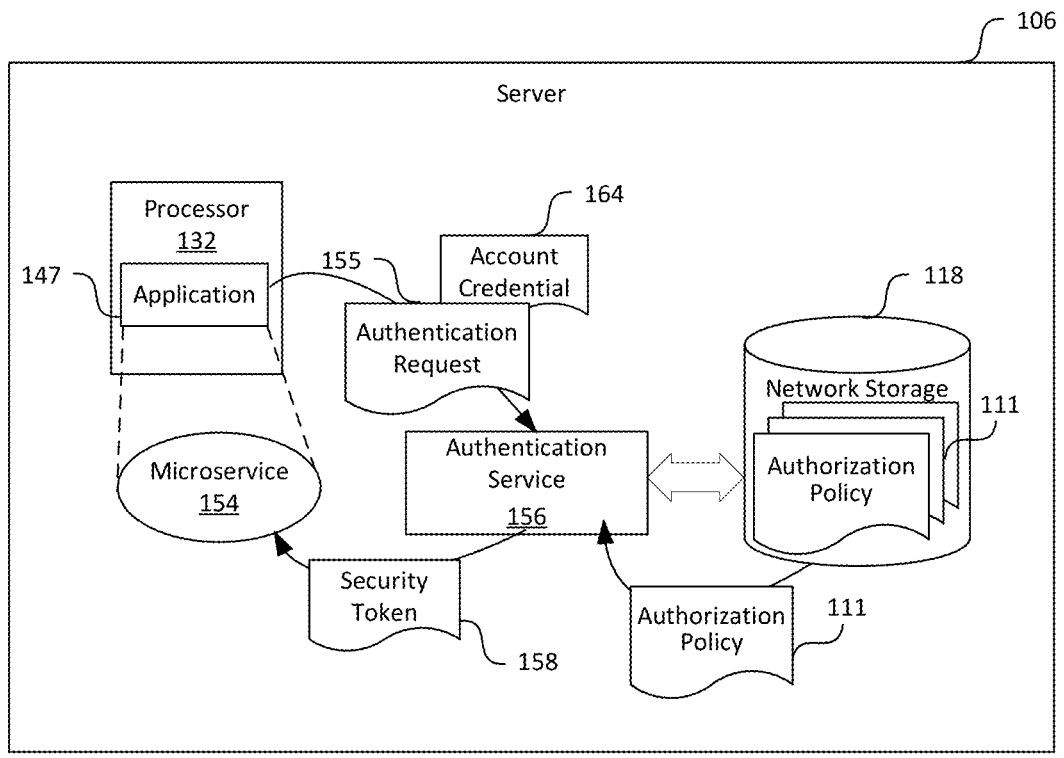
FIG. 5 is a schematic block diagrams illustrating keyless authentication using client-server authentication in the distributed computing system in accordance with embodiments of the present technology.

FIGS. 4A-5 are schematic block diagrams illustrating keyless authentication of computing services in the distributed computing system 100 in accordance with embodiments of the present technology. As shown in FIG. 4A, a server 106 can execute suitable instructions with a processor 132 (FIG. 2) to provide a container manager 160 that supports and manages one or more containers 162. Only one container 162 is shown in FIG. 4A for illustration purposes. The container 162 can be configured to execute an application 147 execution of which provides a microservice 154. Though the container manager 160 and the container 162 are shown as being hosted on the server 106, in other implementations, the container manager 160 and the container 162 can also be hosted in a virtual machine 144 (FIG. 2) on the server 106. In further implementations, the container manager 160 and/or the container 162 can be hosted in other suitable computing environments.

As shown in FIG. 4A, the container manager 160 can be configured to receive an initialization command 170 to instantiate a microservice 154 from a user 101 (FIG. 1) or one of the computing services shown in FIGS. 3A and 3B. In response, the container manager 160 can be configured to transmit a token request 172 to the authentication service 156 for an identity assertion token (shown as "identity token 159" in FIG. 4A) corresponding to an application 147 execution of which in the container 162 instantiates the microservice 154. Upon receiving the token request 172, the authentication service 156 can be configured to determining an identity of the application 147 and optionally the container manager 160, access the network storage for a record of authorization policy 111 corresponding to the determined identity of the application 147 and optionally the container manager 160. In one embodiment, the authorization policy 111 can include data indicating whether an application 147 with the determined identity is authorized for an identity assertion token 159. The following is an example authorization policy 111:

```
AppIdentities" : [
{
"Name" : "<Container1.Identity1>"
"Rings" : ["Dev", "EXAMPLEV1"]
}]"IdentityAssertionPermissions" : [
{
"LinkedAppId" : "<ContainerManagerAppId>"
"AllowedAppIdentities" : ["<Container1.Identity1>"]
}]
```

As shown above, the authorization policy 111 identifies a "Name" having a value of "container1.Identity1, an execution environment as indicated by "Ring" having a value of "Dev" and a name of "EXAMPLEV1". The identity assertion permissions indicate that a container manager 160 with an identifier of "ContainerManagerAppId" is allowed to receive the identity assertion token 159 for an application 147 having an identity value of "Container1.Identity1." In other example, the authorization policy 111 can also include additional and/or different data fields.

Upon retrieving the authorization policy 111, the authentication service 156 can then be configured to determine whether the application 147 with the determined identity is authorized for the requested identity assertion token 159 based on the accessed record of authorization policy 111. For instance, in the example above, when the container manager 160 has an identifier of "ContainerManagerAppId" and requests the identity assertion token 159 for the application 147 having an identity value of "Container1.Identity1," the authentication service 156 can indicate that the identity assertion token 159 is allowed. Otherwise, the authentication service 156 can reject the token request 172 by, for instance, issuing an error message to the container manager 160. In response to determining that the application 147 with the determined identity is authorized for the requested identity assertion token 159, the authentication service 156 can be configured to generate and transmit the requested identity assertion token 159 to the container manager 160 at the server 106.

The identity assertion token 159 can be formatted according to many data schemas. The following is an example identity assertion token 159 formatted as a JSON web token:

```
IdentityAssertionToken
Header
{
  "typ": "JWT",
  "alg": "RS256",
}
Payload
{
  "appid": "4be2d893-6158-4904-9e3f-f0cadf88f526",
  "actort": "user1",
  "ip": "10.10.134.208"
}
```

As shown above, the example identity assertion token 159 can include a header identifying a type, i.e., "typ" with a value indicating JSON web token ("JWT") and a cryptography algorithm, i.e., "alg" with an example value of "RS256." The example identity assertion token 159 can also include a payload with additional data fields. For instance, the payload can include an application identifier, i.e., "appid" with an example value of "4be2d893-6158-4904-9e3f-f0cadf88f526" and an identity name, i.e., "actort" with an example value of "user1" under which the application 147 is to be executed. The payload can also include an IP address, i.e., "ip" of the application 147 with an example value of "10.10.134.208." In other examples, the header and payload of the identity assertion token 159 can also include an issue time, an expiration time, a key identifier, a thumbprint, or other suitable types of data.

As shown in FIG. 4B, the container manager 160 can execute the application 147 in the container 162. Upon receiving the identity assertion token 159, the container manager 160 can also be configured to make the received identity assertion token 159 accessible to the container 162 and the application 147 executing in the container 162. For example, the container manager 160 can store the identity assertion token 159 in the container 162 along with the executed application 147. The container manager 160 can also be configured to modify an entry of a configuration file (not shown) in the container 162. The modified entry allows the instantiated microservice 154 to access the stored identity assertion token 159 in the container 162. In certain embodiments, the configuration file can include a registry of the container 162. In other embodiments, the configuration file can include other suitable types of file that defines an access control list for the identity assertion token 159.

Using the stored identity assertion token 159, the microservice 154 can authenticate itself to the authentication service 156 without using digital certificates. For example, as shown in FIG. 4C, the microservice 154 can be configured to first determine whether the application 147 is executed in a guest operation system, such as the container 162. In response to determining that the application 147 is executed in the container 162, the microservice can access the identity assertion token 159 stored in the container 162 according to the entry in the configuration file. The microservice 154 can then be configured to transmit an authentication request 155 to the authentication service 156. The authentication request 155 includes the identity assertion token 159.

Upon receiving the authentication request 155 with the identity assertion token 159, the authentication service 156 can be configured to determine an identity of the application 147 executed in the container 162 on the server 106 based on the identity assertion token 159 included in the received authentication request 155. For instance, in the above example, the application 147 can have an application identifier of "appid" with a value of "4be2d893-6158-4904-9e3f-f0cadf88f526" and an identity name of "actort" with a value of "user1."

Based on the application identifier and/or the identity name, the authentication service 156 can be configured to retrieve another authorization policy 111 corresponding to the determined identity of the application 147 and determine whether the identity is authorized for issuance of a security token 158 based on the authorization policy 111. As shown in FIG. 4C, in response to determining that the identity of the application 147 is authorized for a security token 158, the authentication service 156 can be configured to generate and transmit, to the microservice 154, the requested security token 158. The microservice 154 can then utilize the security token 158 to authenticate to other computing services in the distributed computing system 100, as shown in FIGS. 3A and 3B, without using digital certificates.

Though bearer token authentication was shown as an example authentication scheme in FIGS. 4A-4C, in other embodiments, the distributed computing system 100 can also implement other authentication schemes without using digital certificates. For example, as shown in FIG. 5, the server 106 can host both the microservice 154 by executing the application 147 with the processor 132 and a runtime of the authentication service 156. Though the microservice 154 and the authentication service 156 are shown as being hosted on a single server 106 in FIG. 5, in other implementations, the foregoing computing services can also be hosted on a single virtual machine 144 (FIG. 2) or other suitable types of host machine.

During instantiation of the microservice 154, the application 147 can be executed with a user account on the server 106, The user account 106 is visible only on the single host and having a privilege level with network access in the distributed computing system 100. During operation, the microservice 154 can be configured to determine whether the microservice 154 and the authentication service 156 reside on a single host, such as the server 106. In response to determining that the microservice 154 and the authentication service 156 reside on a single host, the microservice 154 can be configured to initialize a keyless caller (not shown) that is configured to perform a client-server authentication (e.g., Windows authentication) with the authentication service 156 using the assigned user account during initialization of the microservice 154. For example, the keyless caller can provide a username and a password of the user account to the authentication service 156. The authentication service 156 can then authenticate the microservice 154 using the provided username and password to identify the application 147 and/or the microservice 154.

Upon successful authentication of the provided username and password, the authentication service 156 can be configured to determine whether a security token 158 is allowed to be issued to the microservice 154 based on a record of the authorization policy 111. In response to determining that a security token 158 is allowed to be issued to the microservice 154, the authentication service 156 can be configured to issue a security token 158 to the microservice 154 for interacting with other suitable computing services, such as those shown in FIGS. 3A and 3B. As such, the microservice 154 can authenticate to other computing services without using a digital certificate or managing credential data.

Figure 6A:
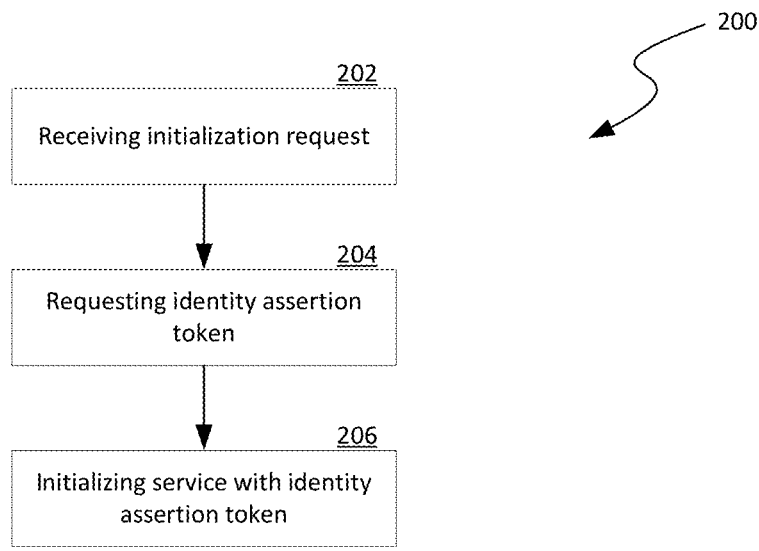
FIGS. 6A and 6B are flow diagrams illustrating aspects of processes for implementing keyless authentication of computing services in accordance with embodiments of the present technology.
Figure 6B:
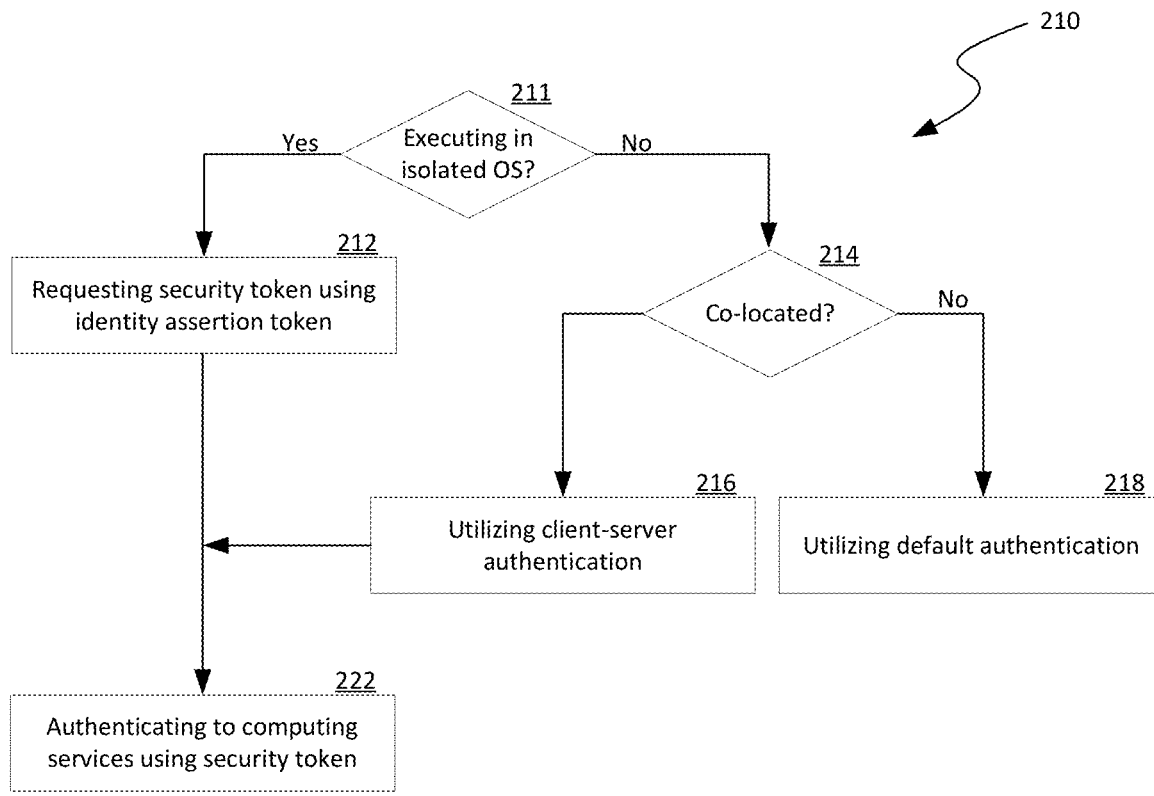

FIGS. 6A and 6B are flow diagrams illustrating aspects of processes for implementing keyless authentication of computing services in a distributed computing system in accordance with embodiments of the present technology. Even though various aspects of the processes are described below in the context of the distributed computing system 100 in FIGS. 1-5, in other embodiments, various aspects of the processes can also be implemented in computing systems with additional and/or different components.

As shown in FIG. 6A, a process 200 can include receiving an initialization request for initializing a computing service at stage 202. In response to receiving the initialization request, the process 200 can include requesting an identity assertion token from an authentication service at stage 204. Upon receiving the identity assertion token, the process 200 can include initializing the computing service with the identity assertion token at stage 206. For example, initializing the computing service can include storing the identity assertion token in a container or other suitable types of guest operation system that also hosts the application and modify an entry of a configuration file in the guest operation system, as described above with reference to FIGS. 4A and 4B.

As shown in FIG. 6B, a process 210 of authenticating a computing service to an authentication service can include a decision stage 211 to determine whether the computing service is provided by executing an application in a guest operating system. In response to determining that the computing service is provided by executing an application in a guest operating system, the process 210 can include requesting a security token from the authentication service using an identity assertion token stored in the guest operating system, as described in more detail above with reference to FIG. 4C. The process 210 can the proceed to authenticating the computing service to other computing services in the distributed computing system using the security token.

In response to determining that the computing service is not provided by executing an application in a guest operating system, the process 210 can include another decision stage 214 to determine whether the computing service is co-located with a runtime of the authentication service. In response to determining that the computing service is co-located with a runtime of the authentication service, the process 210 can proceed to authenticating the computing service to the authentication service using client-server authentication at stage 216, as described above with reference to FIG. 5, before proceeding to authenticating the computing service to other computing services using the security token. Otherwise, the process 210 can proceed to utilizing a default authentication scheme at stage 218.

Figure 7:
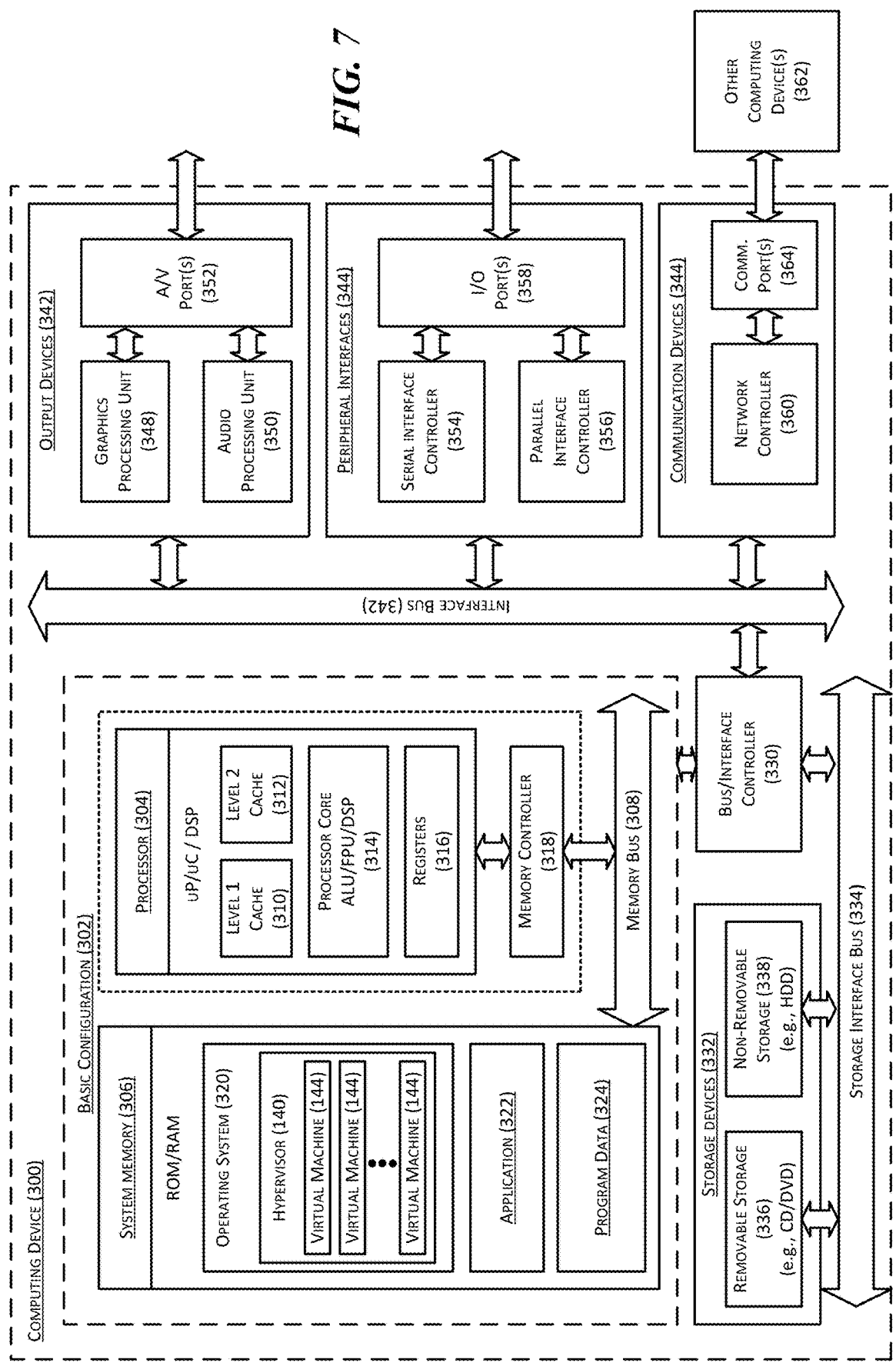
FIG. 7 is a computing device suitable for certain components of the distributed computing system in FIG. 1.

FIG. 7 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of keyless authentication of computing services to an authentication service in a distributed computing system, the method comprising:
   receiving at the authentication service, data representing a request for an identity assertion token corresponding to an application executed in a container on a server;
   in response to receiving the request for the identity assertion token,
      determining an application identity under which the application is executed to provide a computing service;
      determining that the application. with the application identity is authorized for the identity assertion token based on a first record of authorization policy corresponding to the application identity; and
      in response to determining that the application with the application identity is authorized for the identity assertion token, transmitting the identity assertion token to the server;
   receiving, at the authentication service, data representing an authentication request from the computing service for a security token configured to authenticate the computing service to other computing services in the distributed computing system, the authentication request including the identity assertion token previously issued by the authentication service to the application executed in the container on the server, wherein the identity assertion token includes a digital data package that contains security credentials for the application identity under which the application is executed to provide the computing service; and
   in response to receiving the authentication request, at the authentication service,
      determining the application identity of the application executed in the container on the server based on the identity assertion token included in the authentication request; and
      accessing a database for a second record of authorization policy corresponding to the application identity and determining whether the application identity is authorized for issuance of the security token based on the second record of authorization policy; and
      in response to determining that the application identity is authorized for the security token, transmitting, to the computing service, the security token, thereby allowing the computing service to authenticate to other computing services in the distributed computing system without using digital certificates.

2. The method of claim 1 wherein the identity assertion token includes an application identifier and an identity name, and further comprising:
   querying the database for the second record of authorization policy using the application identifier; and
   determining that the application identity is authorized based on the identity name of the identity assertion token.

3. The method of claim 1, further comprising:
   Receiving the data representing the request for the identity assertion token corresponding to the application from a container manager at the server; and
   in response to receiving the request for the identity assertion token, determining an identity of the container manager;
      accessing the database for another record of authorization policy corresponding to the identity of the container manager;
      determining that the application managed by the container manager is authorized for the requested identity assertion token based on the other record; and
      in response to determining that the application is authorized for the requested identity assertion token, transmitting the identity assertion token to the container manager at the server.

4. The method of claim 3, wherein the container manager is configured to store the received identity assertion token in the container along with the executed application.

5. A computing device in a distributed computing system, the computing device comprising:
   a processor; and
   a memory operatively coupled to the processor, the memory containing instructions executable by the processor to cause the computing device to:
      receive, at the computing device, data representing a request for an identity assertion token corresponding to an application executed in a container on a server;
      in response to the request for the identity assertion token,
         determine an application identity under which the application is executed to provide a computing service;
         determine that the application with the application identity is authorized for the identity assertion token based on a first record of authorization policy corresponding to the application identity; and
         in response to the determination that the application with the application identity is authorized for the identity assertion token, transmit the identity assertion token to the server;

receive, at the computing device from the computing service, an authentication request for a security token configured to authenticate the computing service to other computing services in the distributed computing system, the authentication request including the identity assertion token previously issued by the authentication service to the application executed in the container on the server, wherein the identity assertion token includes a digital data package that contains security credentials for the application identity under which the application is executed to provide the computing service;

in response to the authentication request, determine the application identity of the application executed in the container on the server based on the identity assertion token included in the authentication request; and access a database for a second record of authorization policy corresponding to the application identity and determine whether the application identity is authorized for issuance of the security token based on the second record of authorization policy;

in response to determining that the application identity is authorized for the security token, transmit the security token to the computing service, thereby allowing the computing service to authenticate to other computing services in the distributed computing system without using digital certificates.

6. The computing device of claim 5 wherein the memory includes additional instructions executable by the processor to cause the computing device to:

in response to determining that the computing service is not provided on the computing device by executing an application in a container,
determine whether the computing service and the authentication service reside on a single host; and
in response to determining that the computing service and the authentication service reside on a single host, authenticate the computing service to the authentication service for the security token using credentials of a user account of the computing service on the single host.

7. The computing device of claim 5 wherein the memory includes additional instructions executable by the processor to cause the computing device to:

in response to determining that the computing service is not provided on the computing device by executing an application in a container,
determine whether the computing service and the authentication service reside on a single host; and
in response to determining that the computing service and the authentication service reside on a single host, authenticate the computing service to the authentication service for the security token using credentials of a user account of the computing service on the single host, wherein the user account is visible only on the single host and having a privilege level with network access in the distributed computing system.

8. The computing device of claim 5 wherein the memory includes additional instructions executable by the processor to cause the computing device to:

in response to determining that the computing service is not provided on the computing device by executing an application in a container,
determine whether the computing service and the authentication service reside on a single server; and
in response to determining that the computing service and the authentication service reside on a single server, authenticate the computing service to the authentication service for the security token using credentials of a user account of the computing service on the single host, wherein the user account is visible only on the single host and having a privilege level with network access in the distributed computing system.

9. The computing device of claim 5 wherein the instructions cause the computing device to:

transmit, from the computing service, the authentication request for the security token to the authentication service, the authentication request including the identity assertion token; and
receive, from the authentication request, the security token.

10. The computing device of claim 5 wherein the instructions cause the computing device to:

access, with the computing service, the identity assertion token according to an entry in a configuration tile in the container;
transmit, from the computing service, the authentication request for the security token to the authentication service, the authentication request including the accessed identity assertion token; and
receive, from the authentication service, the security token.

11. The computing device of claim 5 wherein the instructions cause the computing device to:

access, with the computing service, the identity assertion token according to an entry in a configuration file in the container;
transmit, from the computing service, the authentication request for the security token to the authentication service, the authentication request including the accessed identity assertion token;
receive, from the authentication service, the requested security token; and
authenticate, with the received security token, the computing device to the other computing services in the distributed computing system.

12. A method of keyless authentication of computing services to an authentication service in a distributed computing system, the method comprising:

receiving, at the authentication service, data representing a request for an identity assertion token corresponding to an application from a container manager at a server;

in response to receiving the request for the identity assertion token,
determining an application identity of the application and a container manager identity of the container manager;
accessing a database for a first authorization policy record corresponding to the application identity and the container manager identity; and
determining that the application with the application identity and managed by the container manager is authorized for the identity assertion token based on the first authorization policy record; and in response to determining that the application with the application identity is authorized for the identity assertion token, generating and transmitting the identity assertion token to the container manager at the server;

receiving, at the authentication service, data representing an authentication request from a computing service for a security token configured to authenticate the computing service to other computing services in the distributed computing system, the authentication request including the identity assertion token previously issued by the authentication service to the application executed in a container on the server, wherein the identity assertion token includes a digital data package that contains security credentials for the application identity under which the application is executed to provide the computing service; and in response to receiving the authentication request, at the authentication service, determining the application identity of the application executed in the container on the server based on the identity assertion token included in the authentication request;

accessing a second authorization policy record corresponding to the application identify and determining that the application identity is authorized for issuance of the security token based on the second authorization policy record; and in response to determining that the application identity is authorized for the security token, transmitting the requested security token to the computing service.

13. The method of claim 12, wherein:

the identity assertion token includes an application identifier and an identity name; and accessing the database includes querying the database for the first authorization policy record using the application identifier; and determining that the application identity is authorized includes determining that the application identity is authorized based on the identity name of the identity assertion token.

14. The method of claim 12, and further comprising:

in response to receiving the authentication request, at the authentication service, accessing the database for the second authorization policy record and determining that the application identity is authorized for issuance of the security token based on the second authorization policy record; and allowing the computing service to authenticate to other computing services in the distributed computing system without using digital certificates.

15. The method of claim 12, and further comprising:

receiving the data representing the request for the identity assertion token corresponding to the application from the container manager at the server.

16. The method of claim 15, and further comprising:

in response to receiving the request for the identity assertion token, determining an identity of the container manager;

accessing the database for a record of authorization policy corresponding to the identity of the container manager;

determining that the application managed by the container manager is authorized for the identity assertion token based on the record of authorization policy; and in response to determining that the application is authorized for the requested identity assertion token, generating and transmitting the requested identity assertion token to the container manager at the server.

17. The method of claim 16, wherein the container manager is configured to store the identity assertion token in the container along with the executed application.

18. The method of claim 17, and further comprising modifying a configuration file that allows the computing service to access the identity assertion token in the container.

19. The method of claim 18, wherein modifying the configuration file comprises modifying an entry of an access control list in the container, the entry allowing only the application to access the identity assertion token.

\* \* \* \* \*